United States Patent
Mingout et al.

(10) Patent No.: US 10,680,422 B2
(45) Date of Patent: Jun. 9, 2020

(54) TRIM FOR ELECTRIC SWITCH AND ELECTRIC SWITCH WITH SUCH TRIM

(71) Applicants: LEGRAND FRANCE, Limoges (FR); LEGRAND SNC, Limoges (FR)

(72) Inventors: Corinne Mingout, Aixe sur Vienne (FR); Jean-Sebastien Guibert, Nieul (FR)

(73) Assignees: LEGRAND FRANCE, Limoges (FR); LEGRAND SNC, Limoges (FR)

( * ) Notice: Subject to any disclaimer, the term of this patent is extended or adjusted under 35 U.S.C. 154(b) by 0 days.

(21) Appl. No.: 15/325,862

(22) PCT Filed: Jul. 17, 2015

(86) PCT No.: PCT/FR2015/051965
§ 371 (c)(1),
(2) Date: Jan. 12, 2017

(87) PCT Pub. No.: WO2016/012699
PCT Pub. Date: Jan. 28, 2016

(65) Prior Publication Data
US 2017/0187173 A1 Jun. 29, 2017

(30) Foreign Application Priority Data
Jul. 21, 2014 (FR) ...................................... 14 57039

(51) Int. Cl.
*H01H 23/30* (2006.01)
*H02G 3/08* (2006.01)
*H01H 23/04* (2006.01)

(52) U.S. Cl.
CPC ............ *H02G 3/081* (2013.01); *H01H 23/04* (2013.01); *H01H 23/30* (2013.01)

(58) Field of Classification Search
CPC ................. H01H 23/30; H01H 23/143; H01H 2021/225; H01H 19/635; H01H 23/04;
(Continued)

(56) References Cited

U.S. PATENT DOCUMENTS

| 4,803,380 A | 2/1989 | Jacoby, Jr. et al. |
| 5,189,259 A | 2/1993 | Carson et al. |

(Continued)

FOREIGN PATENT DOCUMENTS

| CN | 201112225 Y | 9/2008 |
| CN | 101866532 A | 10/2010 |

(Continued)

OTHER PUBLICATIONS

International Search Report, dated Sep. 28, 2015, from corresponding PCT application.

*Primary Examiner* — Ahmed M Saeed
(74) *Attorney, Agent, or Firm* — Young & Thompson (57) ABSTRACT

Disclosed is a trim unit (200) for an electrical switch including a trim plate (210) that presents an opening (215) and a control member (220') that is received in the opening (215). In the trim unit, the trim plate (210) is mounted on a plane front face of a backplate (230) that includes a holder (241) for holding the control member (220) in the opening (215). An electrical switch includes an accessory mechanism and such a trim unit.

17 Claims, 6 Drawing Sheets

(58) Field of Classification Search
CPC ............... H01H 23/145; H01H 23/162; H01H 2025/043; H01H 2233/018; H01H 2233/074; H01H 23/00; H01H 25/041; H01H 25/065; H01H 3/0213; H01H 9/02; H01H 9/18
USPC .......................................... 200/339, 553, 315
See application file for complete search history.

(56) References Cited

U.S. PATENT DOCUMENTS

| | | | |
|---|---|---|---|
| 6,051,785 | A | 4/2000 | Baldwin et al. |
| 6,710,274 | B2 | 3/2004 | Whetzel et al. |
| 8,067,690 | B2 * | 11/2011 | Anders .................. H02G 3/14 174/50 |
| 2008/0081146 | A1 | 4/2008 | Egea Soler |
| 2008/0302646 | A1 * | 12/2008 | Nagai .................. H01H 23/145 200/339 |
| 2010/0132972 | A1 * | 6/2010 | Chaumeny ............... H02G 3/14 174/66 |
| 2010/0270133 | A1 * | 10/2010 | Baker .................. H01H 25/041 200/4 |
| 2013/0137452 | A1 | 5/2013 | Bevan et al. |

FOREIGN PATENT DOCUMENTS

| | | |
|---|---|---|
| CN | 202996673 U | 6/2013 |
| EP | 0 747 916 A1 | 12/1996 |
| EP | 2 133 972 A1 | 12/2009 |
| FR | 2 906 652 A1 | 4/2008 |
| GB | 2 387 484 A | 10/2003 |
| JP | H07-176238 | 7/1995 |
| RU | 2510039 | 3/2014 |

* cited by examiner

TRIM FOR ELECTRIC SWITCH AND ELECTRIC SWITCH WITH SUCH TRIM

TECHNICAL FIELD TO WHICH THE INVENTION RELATES

The present invention relates to an electrical accessory.

It relates more particularly to a trim unit for an electrical switch and to an electrical switch including such a trim unit.

TECHNOLOGICAL BACKGROUND

Patent application CN 201112225 discloses a trim unit for an electrical switch comprising a trim plate that presents an opening and a control member that is received in the opening.

In that document, a decorative frame is mounted in the opening, at the front of the trim plate, and carries a mounting member for mounting the control member.

However, the presence of the decorative frame spoils the visual uniformity of the trim unit; in addition, the decorative frame has both an attractive purpose and a mechanical purpose, which limits the choice of materials that can be used to make that part.

OBJECT OF THE INVENTION

In this context, the present invention proposes a trim unit as described above, in which the trim plate is mounted on a plane front face of a backplate that includes holder means for holding the control member in the opening.

Thus, the trim plate is mounted on a front face of the backplate and may mask the backplate. The material of the backplate may thus be selected for its mechanical properties, in particular for mounting the trim plate and holding the control member, while the material of the trim plate may be selected mainly for the appearance of the part.

Other characteristics of the trim unit that are non-limiting and advantageous are as follows:

the holder means comprise mounting means for mounting the control member on the backplate;

the mounting means are designed to enable the control member to turn relative to the backplate;

the opening is an annular gap that is situated between a central portion of the trim plate and a peripheral portion of the trim plate;

the holder means include an element that forms a rear abutment for the control member;

the opening is oblong, and, at the rear of the trim plate, the control member occupies a space that is greater than the width of the oblong opening;

the rear-abutment-forming element and a portion of the control member present complementary cylindrical shapes;

the control member presents a base that is received between the trim plate and the backplate, and a lever that extends forwards through the opening;

the control member comprises a main body that extends along the length of the oblong opening, and a stem that is situated between the trim plate and the backplate and that extends across the width of the opening;

the front face of the backplate is interrupted at a plurality of locations, and the trim plate covers the front face of the backplate completely; and the control member includes means that are designed to co-operate with a driver of an accessory mechanism.

The invention also proposes an electrical switch comprising an accessory mechanism and a trim unit as proposed above.

In particular, the accessory mechanism may include means for making or breaking an electrical contact depending on the position of a rocking driver, and wherein the control member may thus include mechanical co-operation means for co-operating mechanically with said rocking driver.

Provision may also be made for the backplate to present a wall that extends rearwards with a shape that is complementary to a shape of a base of the accessory mechanism; the accessory mechanism and the trim unit may thus be designed to be assembled by interfitting said wall in said base.

The invention also proposes an electrical switch comprising an accessory support and a trim unit as proposed above, wherein the backplate presents a wall that extends rearwards with a shape that is complementary to a shape of the accessory support, the accessory support and the trim unit being designed to be assembled by interfitting said wall in the accessory support.

In addition, the accessory support may be designed to carry an accessory mechanism. The accessory mechanism may itself include means for making or breaking an electrical contact depending on the position of a rocking driver; the control member of the trim unit may thus include mechanical co-operation means for co-operating mechanically with said rocking driver.

DETAILED DESCRIPTION OF EMBODIMENTS

The following description of non-limiting examples given with reference to the accompanying drawings, makes it possible to understand what the invention consists of and how it can be reduced to practice.

Figure 1:
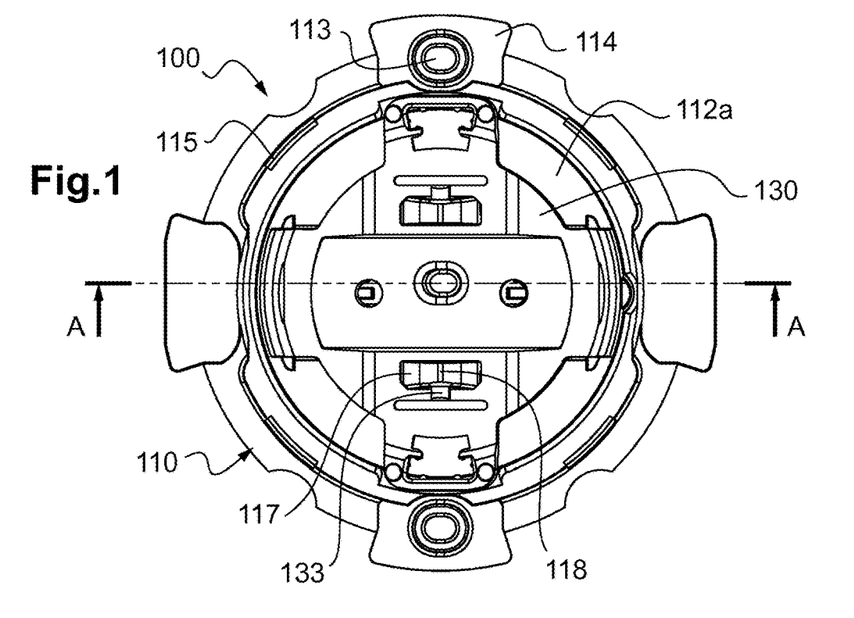
FIG. 1 is a front view of an accessory mechanism used in an electrical switch in accordance with the teaching of the invention.
Figure 2:
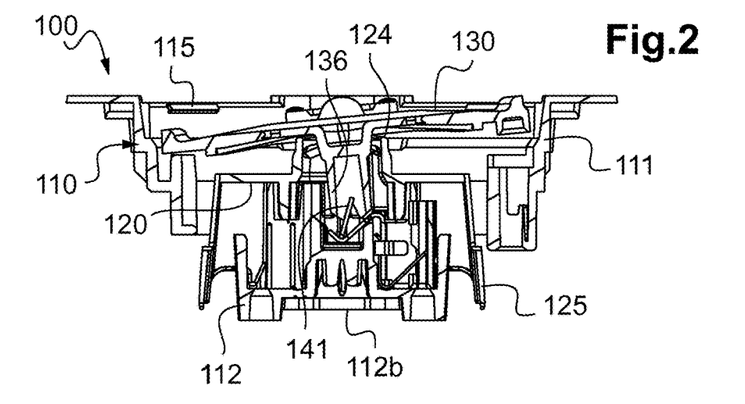
FIG. 2 is a section view of the accessory mechanism on plane A-A shown in FIG. 1.

In the accompanying drawings:

FIGS. 1 and 2 show an accessory mechanism 100 (in this embodiment a switch mechanism) of an electrical switch.

In the present description, the terms "front" and "rear" are thus used relative to the direction in which the user looks at the wall surface on which the electrical switch is fitted. Thus, when the switch is installed in a room, "front" means the face facing into the room, and "rear" means the face facing the opposite way, away from the room.

The accessory mechanism 100 includes an insulating base 110 that forms a support for supporting the accessory mechanism in a box such as a flush-mounted box, as explained below.

The base 110 includes a body 112 from which a side wall 111 extends forwards. The base 110 is open at the front and presents a housing that is adapted to receive the other elements of the accessory mechanism.

The body 112 presents a front face 112a that co-operates with the inside face of the side wall 111 to define the housing. The body 112 also presents a rear face 112b remote from the front face 112a.

The accessory mechanism also includes a cap 120 that is an insulating part mounted in the base (e.g. by snap-fastening), and that holds the electrically-conductive parts housed in the base 110, in particular electrical-connection terminals for connecting to the local electricity network. In conventional manner, the electrical-connection terminals are automatic-connection terminals, such that each of them is operable by a disconnection lever that passes through an opening formed in the wall of the base 110 so as to act on a spring blade of the corresponding terminal, which spring blade is adapted to flatten the stripped end of the electrical conductor against the cage of the connection terminal. Each disconnection lever includes a control lever 125 that is carried by the cap 120 and that is accessible to the user on the outside of said base 110.

The accessory mechanism 100 also includes a brush 141 that is adapted to rock about a rocking axis between two extreme positions, so as to make or break contact between a movable contact element, e.g. a movable contact stud that is carried by the brush, and at least one stationary contact element, e.g. a stationary contact stud that is carried by a contact blade that is itself electrically connected to one of the electrical-connection terminals.

The accessory mechanism 100 also includes a driver 130 that is mounted to rock on the base 110 by means of two pins 133 that are formed on the driver 130 and that are engaged respectively in two corresponding bearings 118 formed in the base 110, e.g. at the top of two projecting portions 117 of the body 112 of the base 110, thus forming a rocking axis for rocking the driver 130 in the base 110.

The driver 130 is an insulating part, e.g. made by molding plastics material, that includes both a connection piece for connecting to a control member, which connection piece extends in the housing formed in the base 110 as mentioned above, and also a chimney 136 that extends rearwards along a direction that is generally perpendicular to the connection piece, at the rocking axis, through an opening 124 formed in the cap 120 for this purpose. The connection piece of the driver 130 is described in greater detail below with reference to FIG. 3.

As can be seen clearly in FIGS. 1 and 2, the cap 120 is thus mounted in the housing formed in the base 110 between the body 112 of the base 110 and the connection piece of the driver 130.

Finally, the accessory mechanism 100 includes resilient toggle means (not shown), e.g. a spring mounted in the chimney 136 formed on the driver 130. After passing through a hard point, the resilient toggle means are suitable for urging the brush 141 towards one or the other of its extreme positions as a function of the position of the driver 130.

The accessory mechanism 100 is for mounting in a box (not shown) for fitting on, or in, a wall surface, either by surface mounting the box on the wall or by flush mounting it in the wall. To do this, the base 110 presents holes 113 that are formed respectively in tabs 114 that extend towards the outside of the base 110 from the front end of the side wall 111: each of the holes 113 is for passing the threaded shank of a screw (having a head that bears against the edge of the hole) for screw-fastening in a corresponding tapped cylinder (not shown) of the box (e.g. a flush-mounted box), thereby making it possible to fasten the accessory mechanism 100 in the box.

As shown in FIGS. 1 and 2, in this embodiment of generally cylindrical shape, the side wall 111 of the base 110 presents catches 115 at a plurality of positions along its inside periphery for co-operating with anchor means for anchoring a trim unit, as described below, so as to mount the trim unit on the accessory mechanism 100.

Figure 3:
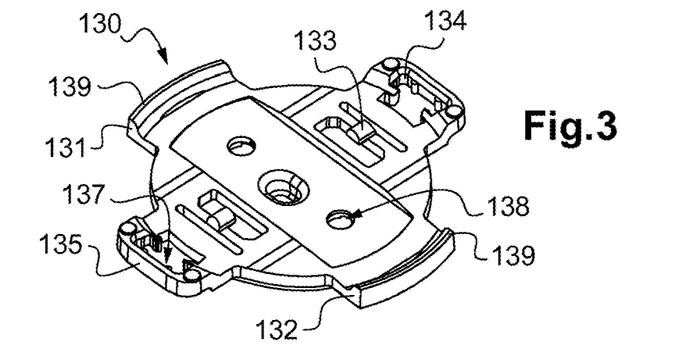
FIG. 3 is a perspective view of a driver of the accessory mechanism shown in FIGS. 1 and 2.

FIG. 3 is a perspective view of the driver 130.

The connection piece of the driver 130 presents the general shape of a disk (having a circumference that is essentially coaxial with the cylindrical side wall 111) from which four arms 131, 132, 134, 135 extend.

A first arm 134 and a second arm 135 respectively extend on either side of the disk in the general direction of the rocking axis of the driver 130 (and thus in register with a pin 133). Each of the first and second arms 134 and 135 is provided with a recess 137 (in this embodiment an open recess) suitable for co-operating with a complementary portion of a control member, as explained below.

A third arm 131 and a fourth arm 132 extend on respective sides of the disk in a direction that is generally perpendicular to the rocking axis of the driver 130. In the embodiment described, the first arm 134, the second arm 135, the third arm 131, and the fourth arm 132 are thus distributed regularly over the circumference of the disk.

Each of the third and fourth arms 131 and 132 is terminated at its free end by a bead 139 that projects forwards.

At the disk and in the general direction in which the third and fourth arms 131 and 132 extend, the connection piece of the driver 130 presents two recesses 138 (in this embodiment open recesses), that are situated on either side of the center of the disk and that are for co-operating with complementary portions of a control member of a type other than the type mentioned above.

Figure 4:
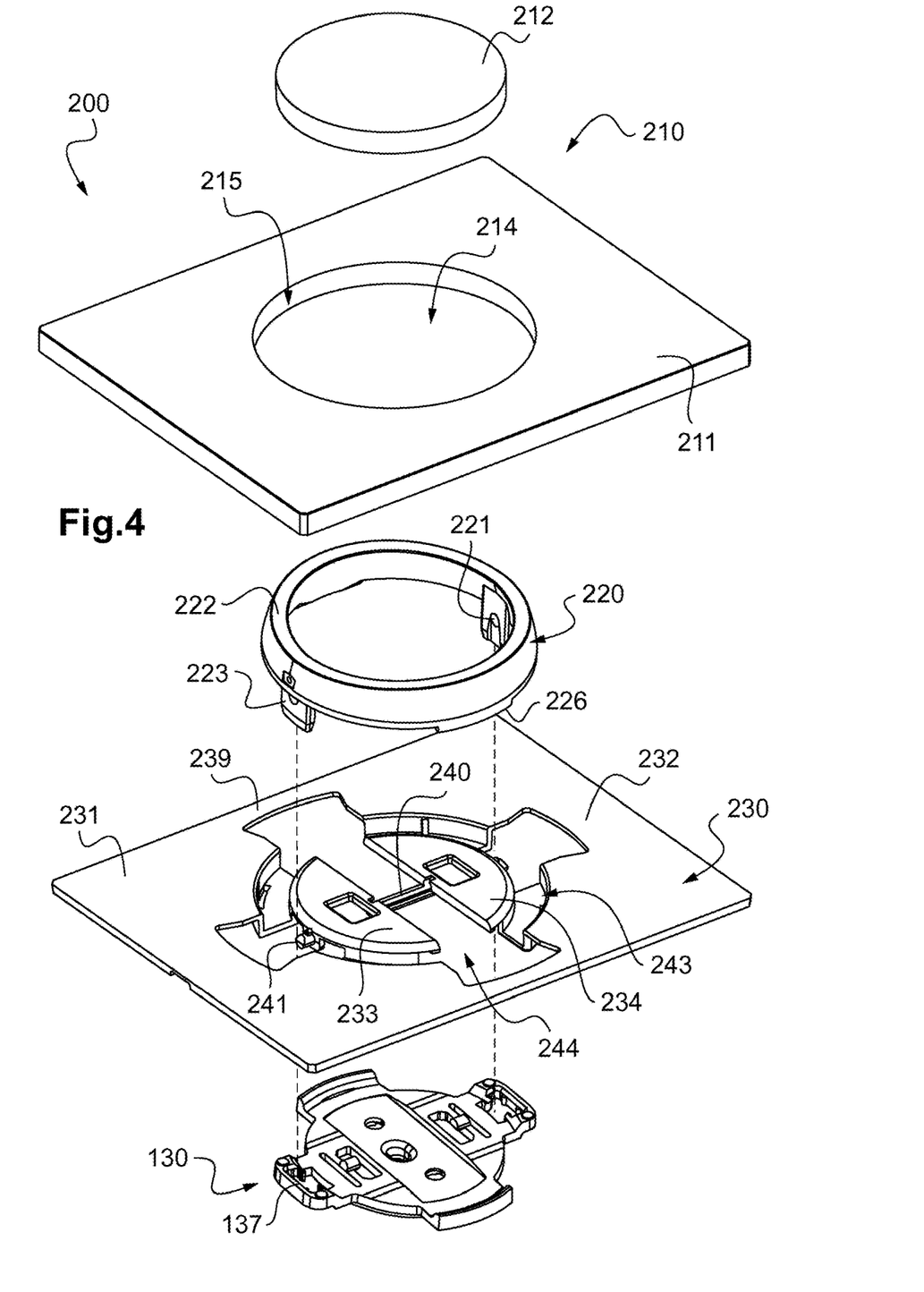
FIG. 4 is an exploded view showing a trim unit in accordance with the teaching of the invention together with the FIG. 3 driver.

FIG. 4 is an exploded view showing a trim unit 200 in accordance with the teaching of the invention, and the driver 130.

The trim unit 200 comprises a trim plate 210, in this embodiment formed by a peripheral portion 211 and by a separate central portion 212, a control member 220, and a backplate 230.

Figures 5, 6:
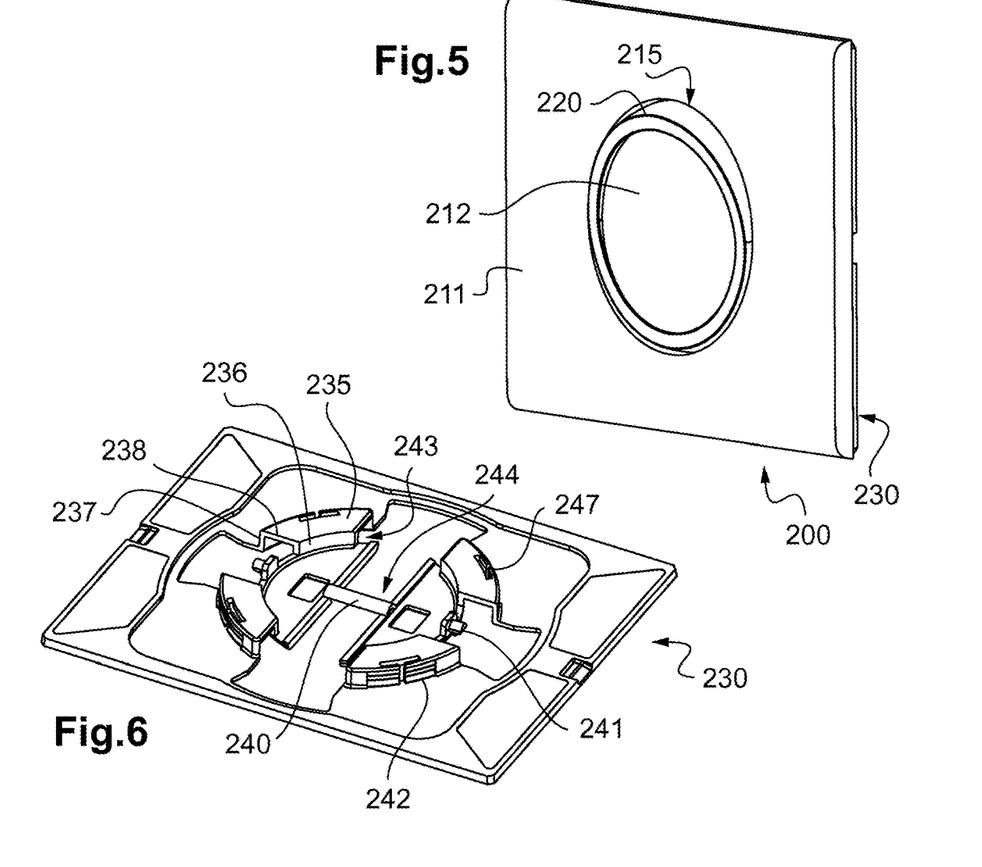
FIG. 5 shows the assembled FIG. 4 trim unit in its mounted position on a vertical wall.
FIG. 6 shows a backplate of the trim unit shown in FIGS. 4 and 5.

The outside of the peripheral portion 211 of the trim plate 210 has a shape that is generally rectangular and presents a central recess 214, in this embodiment a circular recess having a diameter that (ignoring clearance) corresponds to the outside diameter of the control member 220, in this embodiment an annular control member, such that the circular central recess 214 can house both the annular control member 220 and also the central portion 212, which in this embodiment is in the shape of a disk, the central portion 212 being at the center of the control member 220, as can be seen clearly in FIG. 5, which shows the assembled trim unit.

In the general plane in which the trim plate 210 extends (which plane is parallel to the general plane in which the backplate 230 extends as described below), the control member 220 (in its mounted position as shown in FIG. 5) extends along a line that forms a closed curve (in the shape of a circle in the embodiment of FIGS. 4 and 5). In its mounted position and while lying it in the general plane in which the trim plate 210 extends, the central portion 212 of the trim plate 210 thus extends inside the closed curve formed by the control member 220, while the peripheral portion 211 extends outside the closed curve.

In other words, the trim plate 210 includes an opening (or gap) 215, in this embodiment an annular gap, defined between the inner edge of the central recess of the peripheral portion 211 and the outside edge of the central portion 212, through which the annular control member 220 emerges.

Naturally, in other variants, provision could be made for the opening of the trim plate to follow a closed line that is square or rectangular (or a closed line of any other shape, e.g. triangular or oval), the control member, that is received in the opening, thus presenting a matching shape that extends along a square or rectangular closed curve (or, in general manner, a shape that corresponds to the shape of the opening).

As shown more particularly in FIG. 4, the backplate 230 includes a plane front face that is interrupted at a plurality of positions such that the front face defines two side portions 231, 232 (a left side portion 231 and a right side portion 232) and two central portions 233, 234 (a left central portion 233 and a right central portions 234).

The unit formed by the two central portions 233, 234 is separated from the unit formed by the two side portions 231, 232 by an annular gap 243 in which the annular control member 220 is received in its mounted position.

Figure 8:
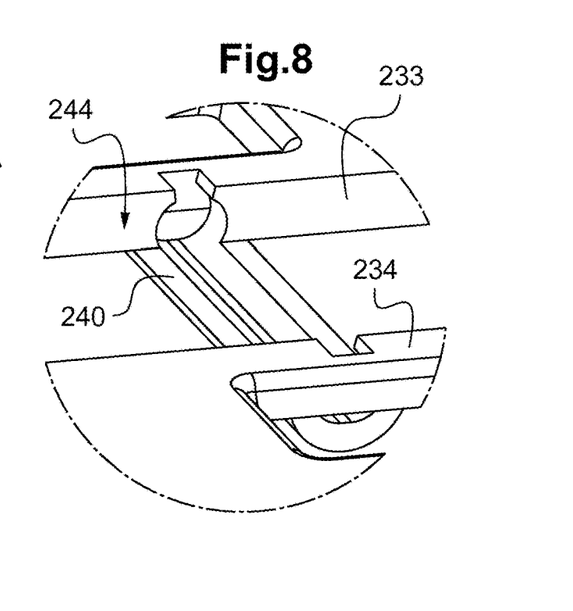
FIG. 8 is a second view of a detail of the FIG. 6 backplate.

The unit formed by the left side portion 231 and by the left central portion 233 is also separated from the unit formed by the right side portion 232 and by the right central portion 234 by a generally rectangular opening 244 that is defined at each of its two ends by an arm of material 239 that connects together the left side portion 231 and the right side portion 232, and that is crossed in its center by a cylinder portion 240 (as can be seen clearly in the view of a detail in FIG. 8), connecting together the left central portion 233 and the right central portion 234.

As can be seen clearly in FIG. 6, which shows the rear face of the backplate 230, each central portion 233, 234 is also connected to the corresponding side portion 231, 232 by means of two bridges 235. Each bridge 235 is formed by a first side wall 236 that extends rearwards from the outer periphery of the central portion 233, 234 under consideration, by a second side wall 237 that extends rearwards from an inner edge of the side portion 231, 232 under consideration, and by a rear wall 238, essentially parallel to the front face of the backplate 220 and set back relative to said backplate, and interconnecting the first side wall 236 and the second side wall 237.

As a result of its shape, each bridge 235 thus serves to participate in mechanically connecting a central portion 233, 234 to a side portion 231, 232, while leaving the above-mentioned annular gap 243 free, in particular in the plane of the front face of the backplate 230, in order to receive the annular control member 220 in this annular gap 243.

It should also be observed that for each bridge 235, the outer surface of the second side wall 237 presents grooves 242 that form the anchor means for coming to co-operate with a corresponding catch 115 of the base 110 of the accessory mechanism 100, so as to hold the trim unit 200 on the accessory mechanism 100 as mentioned above.

In this respect, the second side walls 237 of all of the bridges 235 lie in a cylinder of diameter that is substantially identical to the diameter of the cylindrical side wall 111 of the base 110 of the accessory mechanism 100 so that, while the trim unit 200 is being mounted on the accessory mechanism 100, the bridges 235 become interfitted in the housing formed by the base 110, as mentioned above.

In order to make such mounting easier, provision is made for the grooves 242 to be arranged on resilient tabs 247 that extend from the outer surface of the second side wall 237. For each bridge 235, the second side wall 237 includes two resilient tabs 247 in this embodiment. By way of example, at rest, the resilient tabs 247 extend a little beyond the above-mentioned cylinder (corresponding to the diameter of the cylindrical wall 111), and may be returned by springiness towards the annular gap 243, e.g. as a result of mounting the trim unit 200 on the accessory mechanism 100, so as to bear against the cylindrical side wall 111 of the base 110, which ensures that the trim unit 200 is held on the accessory mechanism 100.

Despite the interruptions in material (annular gap 243, generally rectangular opening 244), the front face (in particular formed by the side portions 231, 232 and by the central portions 233, 234) extends over more than half the available surface area as a result of the dimensions of the backplate 230. In other words, in the plane of the front face of the backplate 230, the surface area of the front face (mainly the solid portions 231, 232, 233, 234) is greater than the combined surface area of the annular gap 243 and of the generally rectangular opening 244. The plane front face of the backplate 230 thus forms a good support for the trim plate 210, specifically for the rear face (which is also plane) of the trim plate 210, e.g. in view of assembly by adhesive-bonding as explained below.

On two teeth that extend rearwards respectively from the rounded outer edges of the left central portion 233 and of the right central portion 234 that define the annular gap 243, the backplate 230 respectively includes two pins 241 of generally cylindrical shape (one of which can be seen on the view of a detail in FIG. 7) for co-operating with corresponding recesses 221 that are formed in the annular control member 220 so that the annular control member 220 can be pivotably mounted on the backplate 230 about a pivot axis that, in the mounted position of the electrical switch, is parallel to the front face of the backplate 230, and that corresponds to the rocking axis for rocking the driver 130 on the base 110.

Figure 7:
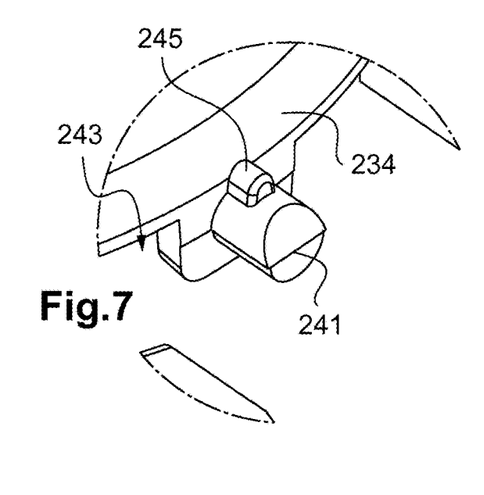
FIG. 7 is a first view of a detail of the FIG. 6 backplate.

By way of example, a lug 245 is also provided situated at the base of each pin 241 in order to limit the lateral clearance of the annular control member 220.

In addition, each central portion 233, 234 also presents a slot that, in the mounted position, is designed to leave a free gap for passing a respective one of the two projecting portions 117 of the body 112 that form the bearings 118.

As already described above, the control member 220 has a generally annular shape that enables it to be situated, in the general extension plane of the trim plate 210, inside the peripheral portion 211 of the trim plate 210, and to surround the central portion 212 of the trim plate 210.

Specifically, the control member 220 comprises a main body 222 that forms a portion of a sphere such that the diameter of the main body 222 at its rear peripheral end (situated at the rear of the front face of the trim plate 210 in its mounted position) is greater than the diameter of the main body 222 at its front peripheral end (situated at the front of the front face of the trim plate 210 in its mounted position), and this gives the main body 222 of the control member 220 a barrel shape that matches the central portion 212 of the trim plate 210 as closely as possible, tapering a little from said trim plate in a forward direction.

As can be seen more clearly in FIG. 4, the control member 220 also includes two tabs 223 that extend rearwards from the main body 222. In the embodiment described, the two recesses 221 for receiving the cylindrical pins 241 provided on the backplate 230 are respectively formed in the two tabs 223.

Finally, the control member 220 includes two projections 226 each of which extends rearwards a little from the rear edge (in this embodiment a circular rear edge) of the main body 222, over a portion only of the circumference of the rear edge that is distinct from the portions carrying the tabs 223.

In the mounted position of the electrical switch (i.e. when the trim unit 200 is mounted on the accessory mechanism 100), the rear end of each tab 223 is housed in the corresponding complementary recess 137 that, as mentioned above, is formed in the driver 130 (as shown by the dashed lines in FIG. 4) so that when the user rocks the control member 220 (in this embodiment about the pivot axis formed by the cylindrical pins 241, in alignment with the rocking axis of the driver 130), which also causes one of the projections 226 of the control member 220 to bear against the corresponding bead 139 of the driver 130, the driver 130 is caused to rock and the electrical switch is thus caused to switch.

In order to assemble the trim unit 200 as shown in FIG. 5, the central portion 212 of the trim plate 210 is fastened (e.g. by adhesive-bonding) on the central portions 233, 234 of the front face of the backplate 230; the annular control member 220 is then mounted on the backplate 230 by co-operation between the cylindrical pins 241 and the recesses 221 (e.g. by acting on the springiness of the tabs 223 during mounting). Finally, the peripheral portion 211 of the trim plate 210 is fastened (e.g. by adhesive-bonding) on the side portions 231, 232 of the backplate 230.

The trim unit 200 may thus be sold in the form of a single-piece product.

In the embodiment described, it should be observed that the backplate 230 (specifically its front face) and the trim plate 210 (specifically the peripheral portion 211 of the trim plate 210) have practically the same external dimensions; provision could be made for the trim plate 210 to have dimensions (length, width) that are a little greater than the dimensions of the front face of the backplate 230, so that only the trim plate 210 can be seen when the electrical switch is viewed from the front.

In addition, the installer or the user purchases an accessory mechanism 100 of the type shown in FIGS. 1 and 2 and described above, and mounts the accessory mechanism 100, as already described above, in a box that is fitted in or on a wall surface.

The installer or the user thus mounts the trim unit 200 on the accessory mechanism merely by interfitting the side wall 111 of the base 110 of the accessory mechanism 100 and the outer wall of the second side wall 237 of the bridges 235 formed at the rear of the backplate 230 (the catches 115 co-operating with the grooves 242 as explained above), and this also enables the co-operation (mentioned above) between the tabs 223 of the control member 220 and the recesses 137 of the driver 130, and thus the control of the switching of the electrical switch by means of the control member 220.

It should be observed that the trim plate 210 (made up of its peripheral portion 211 and of its central portion 212) completely covers the front face of the backplate 230 (in particular the peripheral portions 231, 232 and the central portions 233, 234 of the front face of the backplate 230). In particular, the gap formed between the peripheral portion 211 and the central portion 212 extends in register with the annular gap 243 formed between the central portions 233, 234 and the side portions 231, 232 of the front face of the backplate 230. As can be seen clearly in FIG. 5, the user can thus see only the edge of the backplate 230 once the trim unit 200 is mounted (by means of the accessory mechanism 100) on a wall surface.

Figure 9:
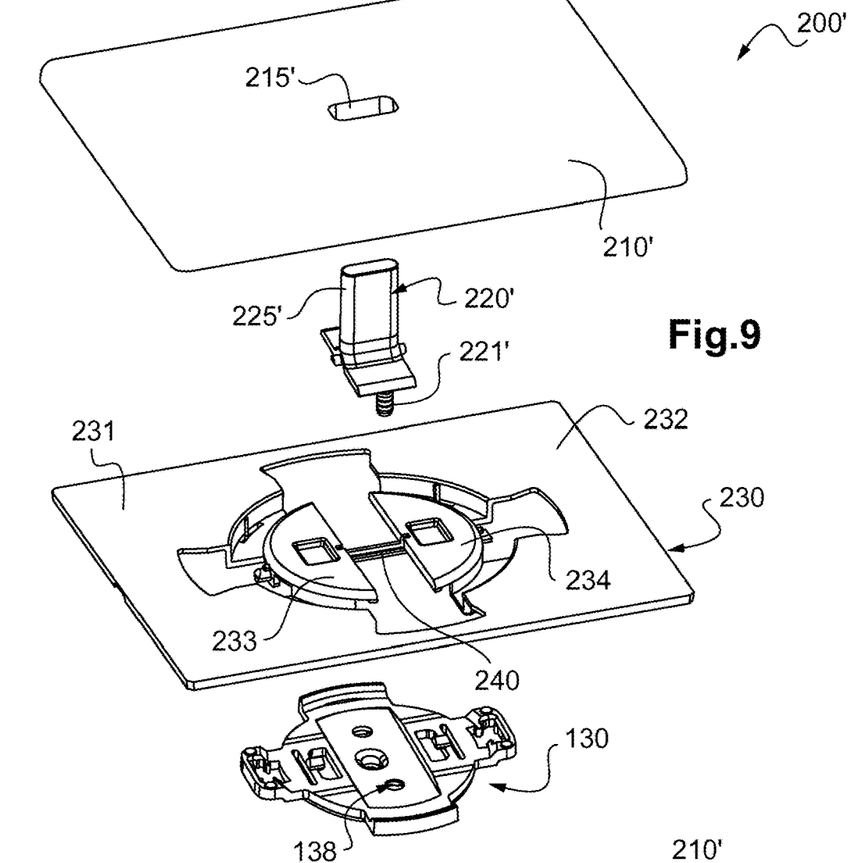
FIG. 9 is an exploded view showing a second example of a trim unit in accordance with the teaching of the invention together with the FIG. 3 driver.
Figure 11:
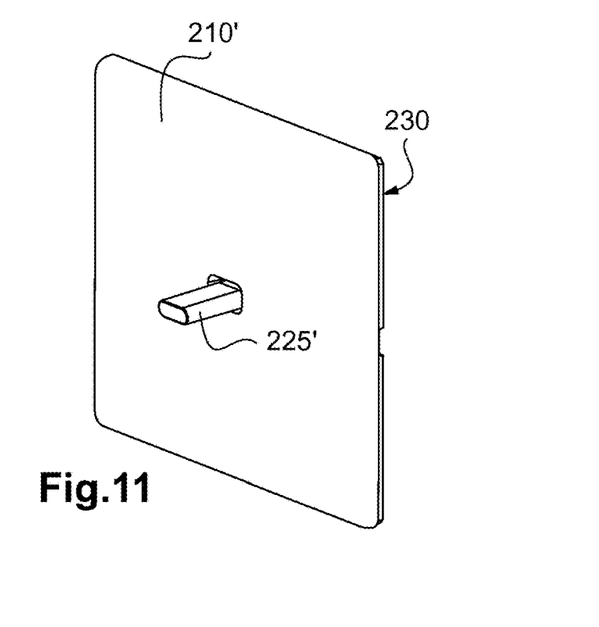
FIG. 11 shows the assembled FIG. 9 trim unit in its mounted position on a vertical wall.

FIGS. 9 and 11 show a second embodiment of a trim unit 200' made in accordance with the teaching of the invention.

The trim unit 200' uses a backplate 230 that is identical to the backplate used in the trim unit 200 shown in FIG. 4, which is advantageous in terms of production since a single type of backplate 230 suffices to make trim units like the trim unit in FIG. 4 and trim units like the trim unit in FIG. 9. The backplate 230 is thus not described in detail again.

In addition to the backplate 230, the trim unit 200' shown in FIG. 9 comprises a trim plate 210' and a control member 220'.

Figure 10:
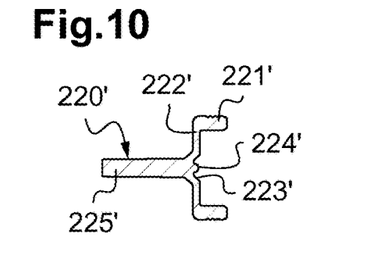
FIG. 10 is a section view showing a control member used in the FIG. 9 trim unit.

The control member 220' is shown in section in FIG. 10: it comprises a base 222' from which a lever 225' extends forwards, and from which two pins 221' extend rearwards. In this embodiment, the lever 225' extends from a central region of the base 222', over the entire width of the base 222', while each pin 221' extends from an end region of the base 222'. In the embodiment described, the outer surfaces of the pins 221' are not smooth so as to make it easier to insert them and to hold them in the recesses 138 of the driver 130 while mounting the trim unit 200' on the accessory mechanism 100 as explained below.

In addition, in a face of the base 222' remote from the face carrying the lever 225', the control member 220' presents a small indentation 223' that is situated in the central region of the base 222'. The indentation 223' presents a cylindrical projection 224' (that extends over the entire width of the base 222', and, in the embodiment described, projects even a little beyond the sides of the base 222' in the width direction) for co-operating with the cylinder portion 240 of the backplate 230 (for the cylinder portion 240, see the detail of FIG. 8 and the description above).

The trim plate 210' is of shape that is generally rectangular and, at its center, presents an oblong opening 215' having dimensions that correspond to the dimensions of the lever 225' (taken in a plane that is perpendicular to the main extension direction of the lever 225'), and in practice are a little greater than those dimensions.

In contrast, it should be observed that the dimensions of the oblong opening 215' are smaller than the dimensions of the base 222' of the control member 220' (taken in the main extension plane of the base 222') such that when the lever 225' is engaged in the opening 215' (as in the assembled position of the trim unit 200' shown in FIG. 11), the control member 220' is prevented from moving forwards by the base 222' (that comes into abutment against the rear face of the trim plate 210').

The trim unit 200' is factory assembled as follows: the base 222' of the control member 220' is arranged between the backplate 230 and the trim plate 210' such that the cylindrical projection 224' co-operates with the cylinder portion 240, and such that the lever 225' passes through the oblong opening 215'.

The trim plate 210' is thus fastened (e.g. by adhesive-bonding) on the front face of the backplate 230, i.e. in this embodiment on the side portions 231, 232 and also on the central portions 233, 234 of the front face of the backplate 230.

The member 220' is thus held between the backplate 230 and the trim plate 210', and the trim unit 200' may thus be sold as a single-piece product.

The trim unit 200' is designed to be mounted on an accessory mechanism 100 as described above, with reference in particular to FIGS. 1 and 2. Specifically, as mentioned above, the backplate 230 of the trim unit 200' is identical to the backplate used for the trim unit 200 shown in FIGS. 4 and 5. The trim unit 200' may thus be mounted on the accessory mechanism 100 by co-operation between the outer wall of the second side wall 237 of the bridges 235 (beside the backplate 230) and the side wall 111 of the base 110 (beside the accessory mechanism 100) as explained above for mounting the trim unit 200.

When the trim unit 200' is mounted on the accessory mechanism 100, the two pins 221' of the control member 220' are housed respectively in the two recesses 138 of the driver 130. Thus, by acting on the lever 225' of the control member 220', the user can control the rocking of the driver 130, and consequently the switching of the electrical switch.

It should be observed that like the trim unit 200, the trim plate 210' completely covers the front face of the backplate 230 (in particular the peripheral portions 231, 232 and the central portions 233, 234 of the front face of the backplate 230). In particular, the oblong opening 215' extends in register with the generally rectangular opening 244 formed in the front face of the backplate 230, at the cylinder portion 240. As can be seen clearly in FIG. 11, the user can thus see only the edge of the backplate 230 once the trim unit 200' is mounted (by means of the accessory mechanism 100) on a wall surface.

In addition, the cylindrical projection 224' and the cylinder portion 240 have complementary shapes (the inside diameter of the cylinder of the cylinder portion 240 corresponding to the outside diameter of the cylinder of the cylindrical projection 224') such that they define a pivot axis for pivoting the control member 220' relative to the backplate 230; this axis is positioned so as to be identical to the rocking axis for rocking the driver 130 in the base 110.

Figures 12, 13, 14:
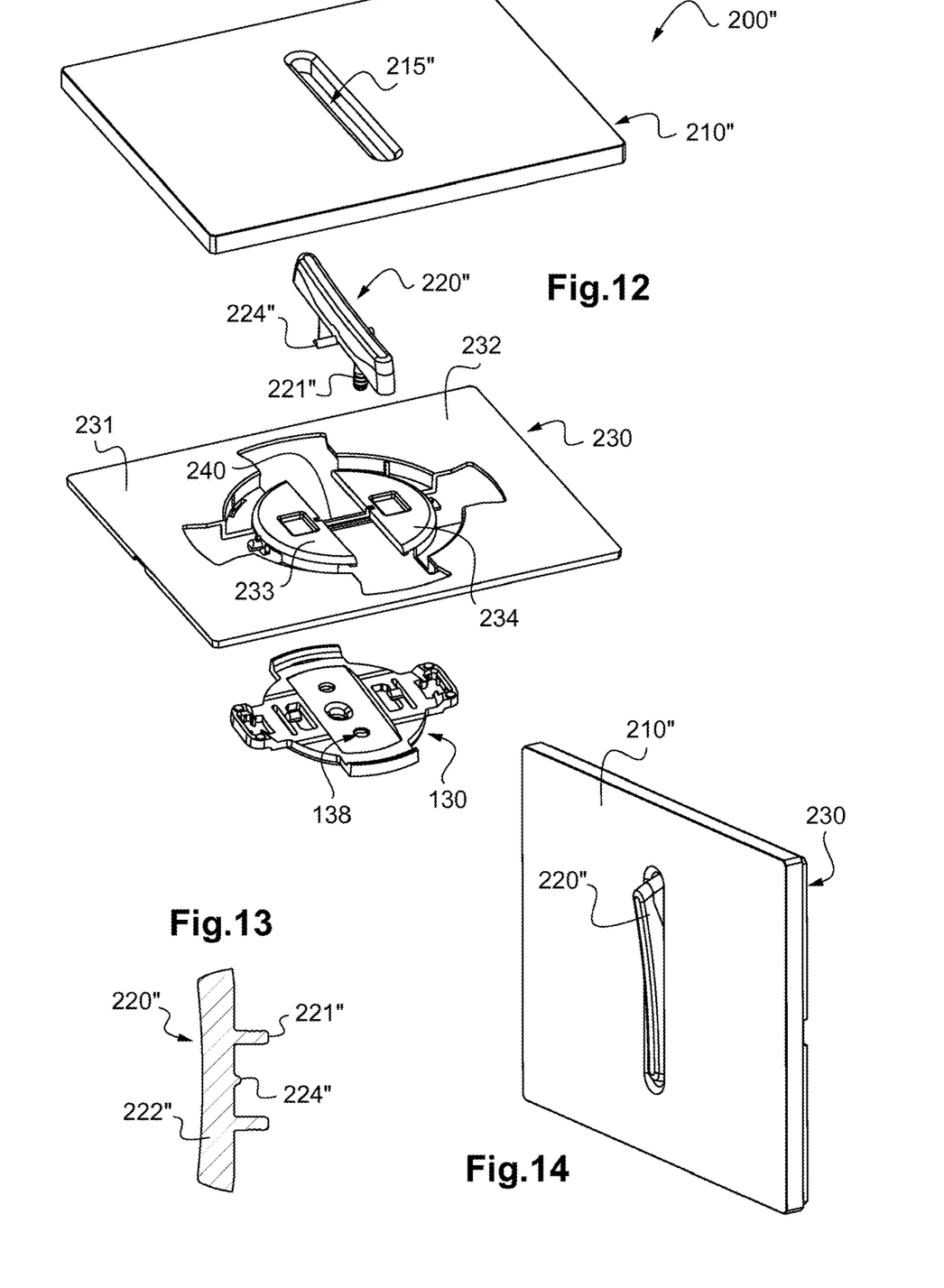
FIG. 12 is an exploded view showing a third example of a trim unit in accordance with the teaching of the invention together with the FIG. 3 driver.
FIG. 13 is a section view showing a control member used in the FIG. 12 trim unit.
FIG. 14 shows the assembled FIG. 12 trim unit in its mounted position on a vertical wall.

FIGS. 12 and 14 show a third embodiment of a trim unit 200" made in accordance with the teaching of the invention.

The trim unit 200" uses a backplate 230 that is identical to the backplate used in the trim unit 200 shown in FIG. 4 and in the trim unit 200' shown in FIG. 9. As mentioned above, this is advantageous in terms of production since a single type of backplate 230 suffices to make distinct trim units like the trim units in FIGS. 4, 9, and 12. The backplate 230 is thus not described in detail again.

In addition to the backplate 230, the trim unit 200" shown in FIG. 12 comprises a trim plate 210" and a control member 220".

The control member 220" is shown in section in FIG. 13: it comprises an oblong main body 222" and, at the rear face of the main body 222", presents two pins 221" and a cylindrical rod 224". The main body 222" is of shape that is generally elongate, its length extending from top to bottom in the mounted position of the trim unit 200", as shown in FIG. 14.

The cylindrical rod 224" is situated in a central region of the control member 220" (in the length direction of the main body 222") with its cylinder axis perpendicular to the length of the main body 222". The cylindrical rod 224" is for co-operating with the cylinder portion 240 of the backplate 230, in this embodiment over the entire length of the cylinder portion 240, such that the cylindrical rod 224" projects beyond either side of the width of the main body 222".

As in the preceding embodiment, the outer surfaces of the pins 221" are not smooth so as to make it easier to insert them and to hold them in the recesses 138 of the driver 130 while mounting the trim unit 200" on the accessory mechanism 100 as explained below.

The trim plate 210" is of shape that is generally rectangular and, at its center, presents an oblong opening 215" having a length that extends vertically (when the trim unit is mounted on a vertical wall surface as shown in FIG. 14) so as to receive the main body 222" of the control member 220". For this purpose, the dimensions of the oblong opening 215" correspond to the dimensions of the main body 222" of the control member 220", i.e. in practice they are a little greater.

In contrast, it should be observed that the width of the oblong opening 215" is smaller than the length of the cylindrical rod 224" (that, as mentioned above, projects beyond either side of the width of the main body 222") such that when the main body 222" is placed in the opening 215" (as in the assembled position of the trim unit 200" shown in FIG. 14), the control member 220" is prevented from moving forwards by the cylindrical rod 224" (that comes into abutment against the rear face of the trim plate 210").

The trim unit 200" is factory assembled as follows: the control member 220" is arranged in the oblong opening 215" (the cylindrical rod 224" being situated to the rear of the trim plate 210"), and the backplate 230 is fitted to the rear of the trim plate 210' such that the cylindrical rod 224" co-operates with the cylinder portion 240.

The trim plate 210" is thus fastened (e.g. by adhesive-bonding) on the front face of the backplate 230, i.e. in this embodiment on the side portions 231, 232 and also on the central portions 233, 234 of the front face of the backplate 230.

The control member 220" is thus held between the backplate 230 and the trim plate 210", and the trim unit 200" may thus be sold as a single-piece product to installers and to users. However, it should be observed that the control member 220" is free to pivot about the axis formed by the co-operation between the cylindrical rod 224" and the cylinder portion 240, in particular as a result of the control member 220" being received, at the backplate 230, in the generally rectangular opening 344.

The trim unit 200" is designed to be mounted on an accessory mechanism 100 as described above, with reference in particular to FIGS. 1 and 2. Specifically, as mentioned above, the backplate 230 of the trim unit 200" is identical to the backplate used for the trim unit 200 shown in FIGS. 4 and 5. The trim unit 200" may thus be mounted on the accessory mechanism 100 by co-operation between the outer wall of the second side wall 237 of the bridges 235 (beside the backplate 230) and the side wall 111 of the base 110 (beside the accessory mechanism 100) as explained above for mounting the trim unit 200.

When the trim unit 200" is mounted on the accessory mechanism 100, the two pins 221" of the control member 220" are housed respectively in the two recesses 138 of the driver 130. Thus, by acting on the control member 220", the user can control the rocking of the driver 130, and consequently the switching of the electrical switch.

It should be observed that the cylindrical rod 224" and the cylinder portion 240 have complementary shapes (the inside diameter of the cylinder of the cylinder portion 240 corresponding to the outside diameter of the cylinder of the cylindrical rod 224") such that they define a pivot axis for pivoting the control member 220" relative to the backplate 230; this axis is positioned so as to be identical to the rocking axis for rocking the driver 130 in the base 110.

In addition, like the trim units 200 and 200', the trim plate 210" completely covers the front face of the backplate 230 (in particular the peripheral portions 231, 232 and the central portions 233, 234 of the front face of the backplate 230). In particular, the oblong opening 215" extends in register with the generally rectangular opening 244 formed in the front face of the backplate 230 (over a major portion of the length of said opening 244). As can be seen clearly in FIG. 14, the user can thus see only the edge of the backplate 230 once the trim unit 200" is mounted (by means of the accessory mechanism 100) on a wall surface.

Figures 15, 16:
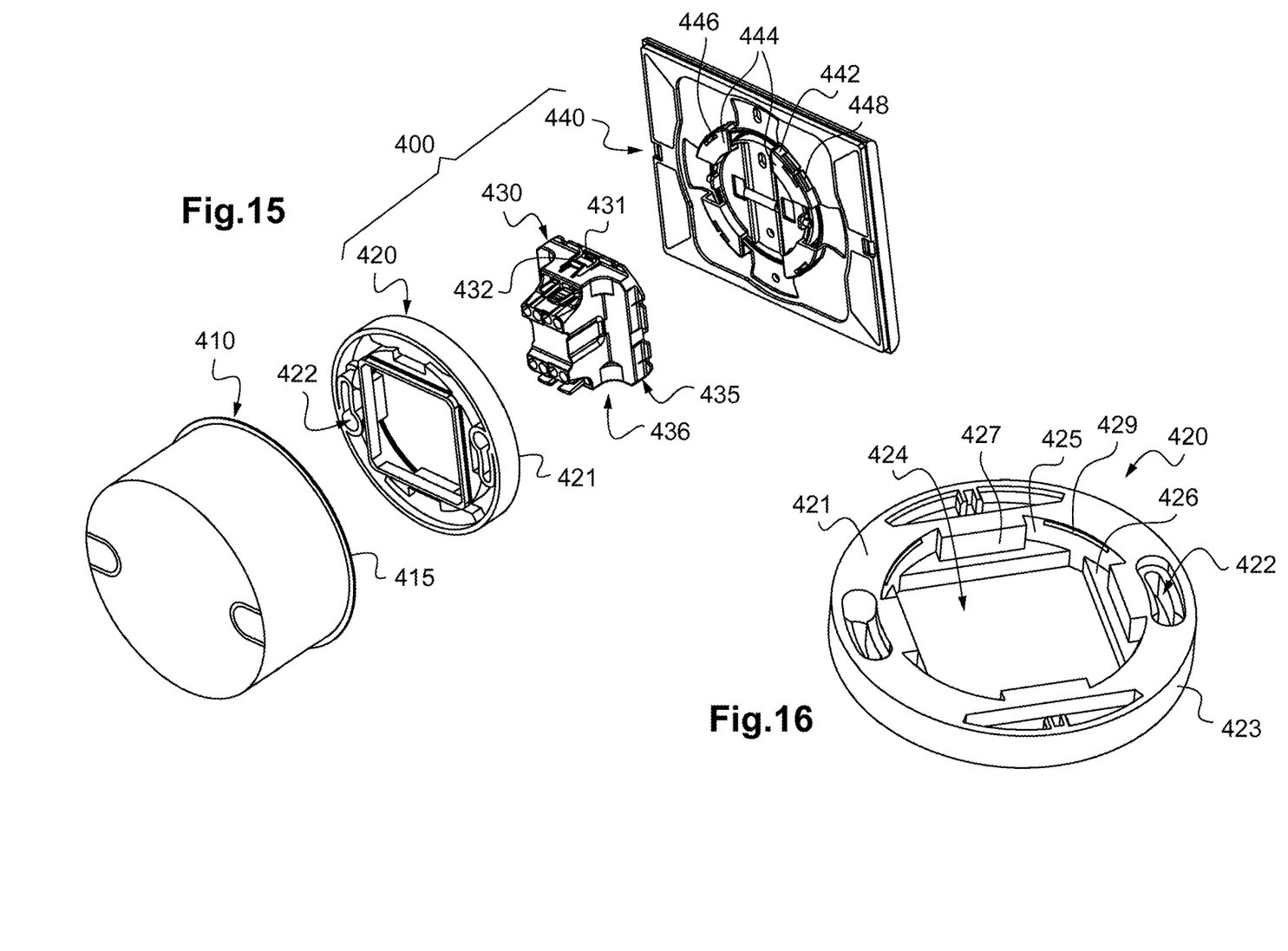
FIG. 15 is an exploded view showing a variant embodiment of an electrical switch.
FIG. 16 is a perspective view showing a support used in the FIG. 15 electrical switch.

FIG. 15 shows a variant embodiment of an electrical switch of the invention.

The electrical switch 400 comprises an accessory support 420, an accessory mechanism 430, and a trim unit 440. The trim unit 440 is identical to the trim unit 200 described above with reference to FIGS. 4 to 8 and is thus not described again below.

As explained in greater detail below, both the accessory mechanism 430 and the trim unit 440 are mounted on the accessory support 420. The accessory support 420 is itself mounted on a flush-mounted box 410 for being received in a recess in a wall where it is desired to fasten the electrical switch 400.

In this embodiment, the accessory support 420 is fastened on the flush-mounted box by means of two screws (not shown) that are received in cylinders respectively provided in diametrally-opposite manner on the inside face of the side wall of the flush-mounted box, such that a collar 421 of the accessory support 420 is held by being clamped between the head of each screw and dedicated plane portions 415 of the flush-mounted box 410.

The collar 421 of the accessory support 420 presents orifices 422 in the shape of key holes, with firstly an oblong portion that receives the threaded shank of each screw, the oblong portion extending along a curve in order to enable angular compensation (as a result of the movement of the accessory support 420 that is permitted by sliding the threaded shanks in the oblong portions of the orifices 422), and secondly a circular end portion that makes it possible to pass the head of each screw.

Like the accessory mechanism described above with reference to FIGS. 1 to 3, the accessory mechanism 430 includes a driver and a brush (not shown) that is adapted to rock about a rocking axis between two extreme positions, so as to make or break contact between a movable contact element, e.g. a movable contact stud that is carried by the brush, and at least one stationary contact element, e.g. a stationary contact stud that is itself carried by a contact blade that is electrically connected to one of the electrical-connection terminals.

In addition, the trim unit 440 includes a control member (identical to the control member 220 described above with reference to FIGS. 4 and 5, but not shown in FIG. 15) that presents means of co-operating with the driver such that the control member and the driver can rock simultaneously, and such that a user can thus control the above-mentioned making or breaking contact by means of the control member.

As can be seen clearly in FIG. 16, the accessory support 420 presents a body 423 that is generally annular, having a front face that forms the above-mentioned collar 421.

The annular body 423 presents an inside face 425 that is generally cylindrical, having a diameter that corresponds to the diameter of the outside walls 442 of the bridges 444 of the trim unit 440 (identical, as mentioned above, to the bridges 235 of the trim unit 200 shown clearly in FIG. 6).

On a portion of its front edge, the inside face 425 presents a clipping edge 429.

Curbs 426 extend from the inside face 425 of the annular body 423 over a portion only of the thickness of the annular body 423, and define between them a central opening 424 (in this embodiment a square opening) of the accessory support 420.

The accessory mechanism 430 is received through the central opening 420. Specifically, a front portion 435 of the accessory mechanism 430, of width that is greater than a rear portion 436 received in the central opening 424, comes into abutment against the front face of the curbs 426 (while mounting the switch 400).

The accessory mechanism 430 is fastened on the accessory support 420 by means of two pairs of clipping tabs 431, 432 that are situated at the periphery of the accessory mechanism 430. Specifically, in each pair, a front clipping tab 431 comes into contact with a front face of a curb 426, and a rear clipping tab 432 comes into contact with a rear face of the same curb 426.

Teeth 427 extend from the inside face 425 of the annular body 423 over a portion of the thickness of the annular body 423 that is distinct from the portion of the thickness that is occupied by the curbs 426 (in front of said curbs), and over a portion only of the periphery of the annular body 423 (the teeth 427 extending in regions in which the trim unit 440 does not present any bridges 444 when the switch 400 is assembled).

The teeth 427 are dimensioned so as to receive between them the front portion 435 of the accessory mechanism 430, which front portion, as mentioned above, comes into abutment against the front face of the curbs 426.

In order to mount the trim unit 440 on the accessory support 420, the bridges 444 of the trim unit 440 are inserted in the center of the annular body 423 (each bridge 444 being received between two teeth 427 of the accessory support 420), thereby enabling the resilient tabs 447 (identical to the resilient tabs 247 mentioned above and shown in FIG. 6) provided with grooves 448 to come into engagement on the inside face 425 of the annular body 423. Specifically, the grooves 448 come to co-operate with the clipping edge 429 that, as mentioned above, is provided on a facing portion of the edge of the inside face 425.

As explained above for the preceding embodiments, as a result of the movement for mounting the trim unit 440 on the accessory support 420, the control member (not shown) of the trim unit 440 is secured to the driver (not shown) of the accessory support by means of the above-mentioned co-operation means, (e.g. a tab on the control member and a corresponding recess on the driver, as can be seen clearly in FIG. 4).

The invention claimed is:

1. A trim unit for an electrical switch, comprising:
   a trim plate having a planar front surface with an opening at a central location thereof;
   a backplate including a planar front face, a rear surface of the trim plate mounted upon said planar front face of the backplate; and
   a control member that is received in the opening of the trim plate and extends outward from the planar front surface of the trim plate;
   wherein said planar front face of the back plate includes a planar peripheral portion and a planar central portion, the peripheral portion completely surrounding the central portion and the central portion including two coplanar portions that are coplanar with the peripheral portion of the planar front face, the two coplanar portions having a gap adjacent thereto in which a rear portion of the control member is received,
   wherein the backplate also includes, adjacent to the two coplanar portions, a holder that cooperates with the control member and holds the control member on the backplate in alignment with the opening of the trim plate, and
   wherein the two coplanar portions have pins provided thereon adapted to cooperate with respective recesses provided on the control member for holding the control member, the control member being pivotably mounted to rotate about said pins.

2. The trim unit according to claim 1, wherein the trim plate is comprised of a central element and a peripheral element, the peripheral element having the opening located therein,
   the central element located inside the opening of the peripheral element, and the peripheral element completely surrounding the central element,
   an outer edge of the central element and an inner edge of the opening in the peripheral element having an annular gap therebetween that receives the control member.

3. The trim unit according to claim 1,
   wherein the front face of the backplate is interrupted at a plurality of locations, and
   wherein the trim plate completely covers the front face of the backplate.

4. The trim unit according to claim 1, wherein the control member is configured to co-operate with a driver of an accessory mechanism.

5. An electrical switch comprising an accessory mechanism and the trim unit according to claim 1.

6. The electrical switch according to claim 5,
   wherein the accessory mechanism is configured to make or break an electrical contact depending on the position of a rocking driver, and
   wherein the control member is configured to mechanically cooperate with said rocking driver.

7. The electrical switch according to claim 5, wherein the backplate comprises a wall that extends rearwards with a shape that is complementary to a shape of a base of the accessory mechanism, the accessory mechanism and the trim unit being configured to be assembled by interfitting said wall in said base.

8. An electrical switch comprising an accessory support and the trim unit according to claim 1,
   wherein the backplate is comprised of a wall that extends rearwards with a shape that is complementary to a shape of the accessory support, the accessory support and the trim unit being designed to be assembled by interfitting said wall in the accessory support.

9. The trim unit according to claim 1, wherein the trim plate comprises a first plate portion having a round void located therein, and a round second plate portion located inside the opening, the opening being formed by an annular gap between an outer edge of the second plate portion and an inner edge of the void of the first plate portion.

10. A trim unit for an electric switch comprising:
    a trim plate,
    a backplate, and
    a control member extending in a first opening defined in the trim plate,
    wherein:
    the trim plate is mounted on a front face of the backplate,
    a second opening is formed in said front face,
    said backplate includes a cylinder portion extending across the second opening and forming a rear abutment for the control member, and
    the control member includes a portion having a shape complementary to the cylinder portion of the backplate, thereby defining a pivot axis for the control member relative to the backplate, said portion of the control member being broader than the first opening so as to abut against a rear face of the trim plate.

11. The trim unit according to claim 10,
    wherein the opening is oblong, and
    wherein, at a rear of the trim plate, the control member occupies a space that is greater than the width of the oblong opening.

12. The trim unit according to claim 10, wherein the control member comprises a base that is received between the trim plate and the backplate, and a lever that extends forwards through the opening.

13. The trim unit according to claim 10, wherein the control member comprises a main body that extends along the length of the oblong opening, and a stem that is situated between the trim plate and the backplate and that extends across the width of the opening.

14. The trim unit according to claim 11, wherein the control member comprises a base that is received between the trim plate and the backplate, and a lever that extends forwards through the opening.

15. A trim unit for an electrical switch, comprising:
    a trim plate having a planar front surface with an opening at a central location thereof;
    a backplate including a planar front face, a rear surface of the trim plate mounted upon said planar front face of the backplate; and
    a control member that is received in the opening of the trim plate and extends outward from the planar front surface of the trim plate,
    wherein said planar front face of the back plate includes a planar peripheral portion and a planar central portion, the peripheral portion completely surrounding the central portion and the central portion including two coplanar portions that are coplanar with the peripheral portion of the planar front face, the two coplanar portions having a gap adjacent thereto in which a rear portion of the control member is received,
    wherein the backplate also includes, adjacent to the two coplanar portions, a holder that cooperates with the control member and holds the control member on the backplate in alignment with the opening of the trim plate, and
    wherein the coplanar portions are connected to the peripheral portion by respective bridges (235), each one of said bridges spanning between a rearward extending first side wall (236) extending in a depth direction of the backplate and a second side wall (237) extending in the depth direction.

16. The trim unit according to claim 15, wherein the opening of the trim plate has an annular shape, and the control member is ring-shaped and is received through the annular opening.

17. The trim unit according to claim 15, wherein said control member is ring-shaped and said bridges are curved in a manner so as to receive said ring-shaped control member.

\* \* \* \* \*